(12) United States Patent
Ha et al.

(10) Patent No.: US 9,655,489 B2
(45) Date of Patent: May 23, 2017

(54) VACUUM CLEANER

(71) Applicant: LG ELECTRONICS INC., Seoul (KR)

(72) Inventors: Gunho Ha, Seoul (KR); Hwajin Lim, Seoul (KR); Changhoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/708,824

(22) Filed: May 11, 2015

(65) Prior Publication Data
US 2015/0320284 A1    Nov. 12, 2015

(30) Foreign Application Priority Data

May 9, 2014    (KR) .................. 10-2014-0055789

(51) Int. Cl.
| | | |
|---|---|---|
| *A47L 9/28* | (2006.01) | |
| *A47L 9/24* | (2006.01) | |
| *A47L 5/36* | (2006.01) | |
| *A47L 9/14* | (2006.01) | |
| *H02J 7/02* | (2016.01) | |
| *H02J 50/10* | (2016.01) | |

(52) U.S. Cl.
CPC .............. *A47L 9/2873* (2013.01); *A47L 5/36* (2013.01); *A47L 9/1409* (2013.01); *A47L 9/246* (2013.01); *A47L 9/2857* (2013.01); *A47L 9/2868* (2013.01); *A47L 9/2884* (2013.01); *H02J 7/02* (2013.01); *H02J 7/025* (2013.01); *H02J 50/10* (2016.02)

(58) Field of Classification Search
CPC ...... A47L 9/2884; A47L 9/246; A47L 9/2857; A47L 9/2868; A47L 9/2873; A47L 9/2842; A47L 5/362
See application file for complete search history.

(56) References Cited

U.S. PATENT DOCUMENTS

| | | | | |
|---|---|---|---|---|
| 4,670,701 A | * | 6/1987 | Sako .................. | A47L 5/24 15/DIG. 1 |
| 5,005,252 A | * | 4/1991 | Steiner ................ | A47L 5/24 15/339 |
| 5,560,077 A | * | 10/1996 | Crotchett .............. | A47L 13/52 15/339 |

(Continued)

FOREIGN PATENT DOCUMENTS

| | | |
|---|---|---|
| GB | 2106728 A | 4/1983 |
| JP | 2004121583 A | 4/2004 |

(Continued)

*Primary Examiner* — Dung Van Nguyen
(74) *Attorney, Agent, or Firm* — Dentons US LLP

(57) ABSTRACT

Provided is a vacuum cleaner. The vacuum cleaner includes a cleaner body including a suction motor for generating a suction force, a suction part communicating with the cleaner body to suction air and dusts, a battery disposed in the cleaner body or suction part to supply a power to the suction motor, and a cleaner connector disposed on the cleaner body or the suction part, a charger including a charger connector separably connected to the cleaner connector to charge the battery, and a disconnection member disposed on the cleaner body or the suction part to selectively connect or disconnect the cleaner connector to or from the battery.

4 Claims, 14 Drawing Sheets

(56) References Cited

U.S. PATENT DOCUMENTS

| | | | | |
|---|---|---|---|---|
| 5,926,909 A | * | 7/1999 | McGee | A47L 5/24 |
| | | | | 15/339 |
| 6,122,796 A | * | 9/2000 | Downham | A47L 5/00 |
| | | | | 15/328 |
| 6,345,411 B1 | * | 2/2002 | Kato | A47L 5/14 |
| | | | | 15/346 |
| 2002/0148070 A1 | | 10/2002 | Tsuchiya et al. | |
| 2005/0017681 A1 | * | 1/2005 | Ogishima | A47L 9/2805 |
| | | | | 320/112 |

FOREIGN PATENT DOCUMENTS

| | | |
|---|---|---|
| KR | 1998013970 U | 6/1998 |
| KR | 1999002655 U | 1/1999 |
| WO | 2008146988 A1 | 12/2008 |

* cited by examiner

VACUUM CLEANER

CROSS-REFERENCE TO RELATED APPLICATIONS

The present application claims priority under 35 U.S.C. 119 and 35 U.S.C. 365 to Korean Patent Application No. 10-2014-0055789 (filed on May 9, 2014), which is hereby incorporated by reference in its entirety.

BACKGROUND

The present disclosure relate to a vacuum cleaner.

In general, vacuum cleaners are devices that suction air containing dusts by using a suction force generated by a suction motor mounted in a main body to filter the dusts in the main body.

Vacuum cleaners are classified into manual cleaners and automatic cleaners. The manual cleaners are cleaners that are used for directly performing cleaning by a user, and the automatic cleaners that travel by oneself to perform cleaning.

The manual cleaners may be classified into a canister type cleaner in which a suction nozzle is provided separately with respect to a main body and connected to the main body by using a connection tube and an upright type cleaner in which a suction nozzle is coupled to a main body.

A power cord outlet of a cleaner is disclosed in Korean Patent Publication No. 10-2006-0118796 (Published Date: Nov. 24, 2006).

According to the prior document, since a cord reel assembly is provided in a main body, and a power cord is connected to a socket, the main body may receive a power.

In the prior document, since a cleaner receives a power through the cord reel assembly, the cleaner may move by only a distance corresponding to a length of the cord wound around the cord reel assembly when the cleaner performs cleaning.

SUMMARY

Embodiments relate to a vacuum cleaner.

In one embodiment, a vacuum cleaner includes: a cleaner body including a suction motor for generating a suction force; a suction part that communicates with the cleaner body to suction air and dusts; a battery disposed in the cleaner body or suction part to supply a power to the suction motor; a cleaner connector disposed on the cleaner body or the suction part; a charger including a charger connector separably connected to the cleaner connector to charge the battery; and a disconnection member disposed on the cleaner body or the suction part to selectively connect or disconnect the cleaner connector to or from the battery.

In another embodiment, a vacuum cleaner includes: a cleaner body including a suction motor for generating a suction force; a suction part that communicates with the cleaner body to suction air and dusts; a battery disposed in the cleaner body or suction part to supply a power to the suction motor; a cleaner connector disposed on the cleaner body or the suction part; and a charger including a charger connector separably connected to the cleaner connector to charge the battery, wherein the charger connector includes a charger terminal part accommodating a plurality of charger terminals, and the cleaner connector includes a terminal insertion part including a plurality of main body terminals connected to the plurality of charger terminals in a state where the charger terminal part is inserted.

In further another embodiment, a vacuum cleaner includes: a cleaner body including a suction motor for generating a suction force; at least one wheel for moving the cleaner body; a suction part communicating with the cleaner body to suction air and dusts; a battery disposed in the cleaner body to supply a power to the suction motor; and a charging current generation part disposed on the cleaner body to receive a charging signal transmitted from the outside, thereby generating charging current for charging the battery, wherein the charging current generation part includes a coil part generating current by an effect of external magnetic fields and a converter for converting the AC current generated by the coil part into DC current.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

Figure 1:
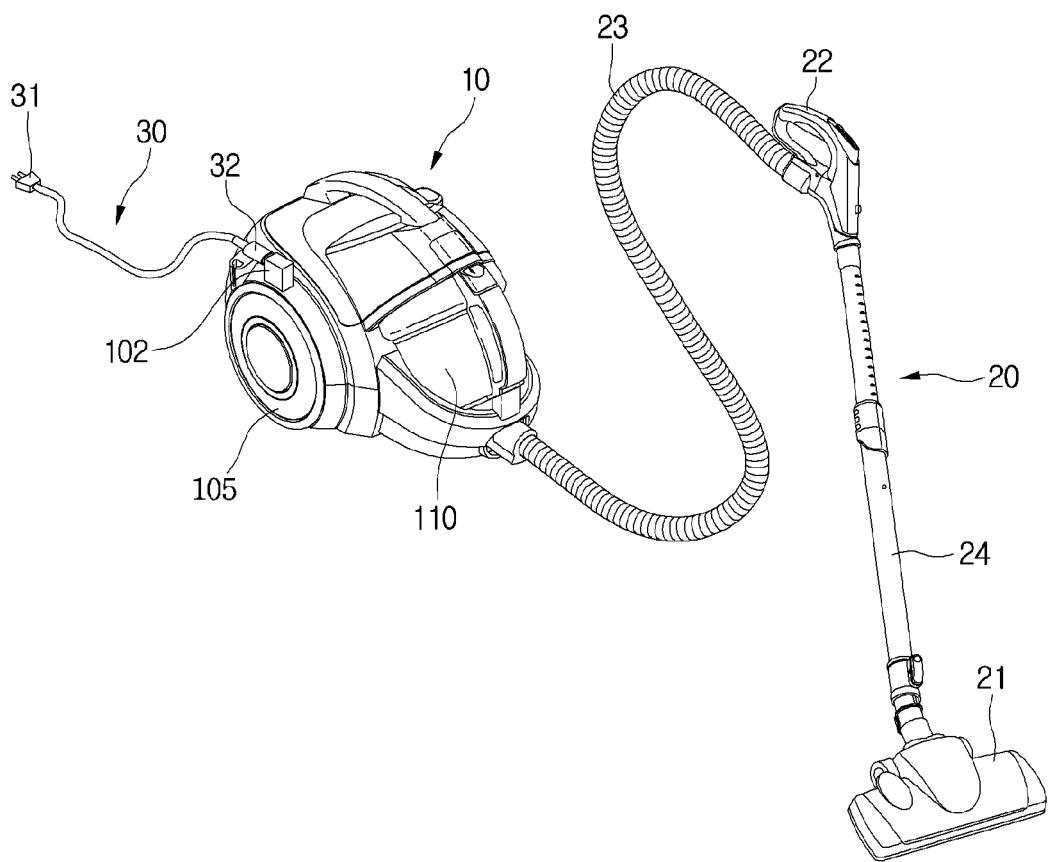
FIG. 1 is a perspective view of a vacuum cleaner according to a first embodiment.
Figure 2:
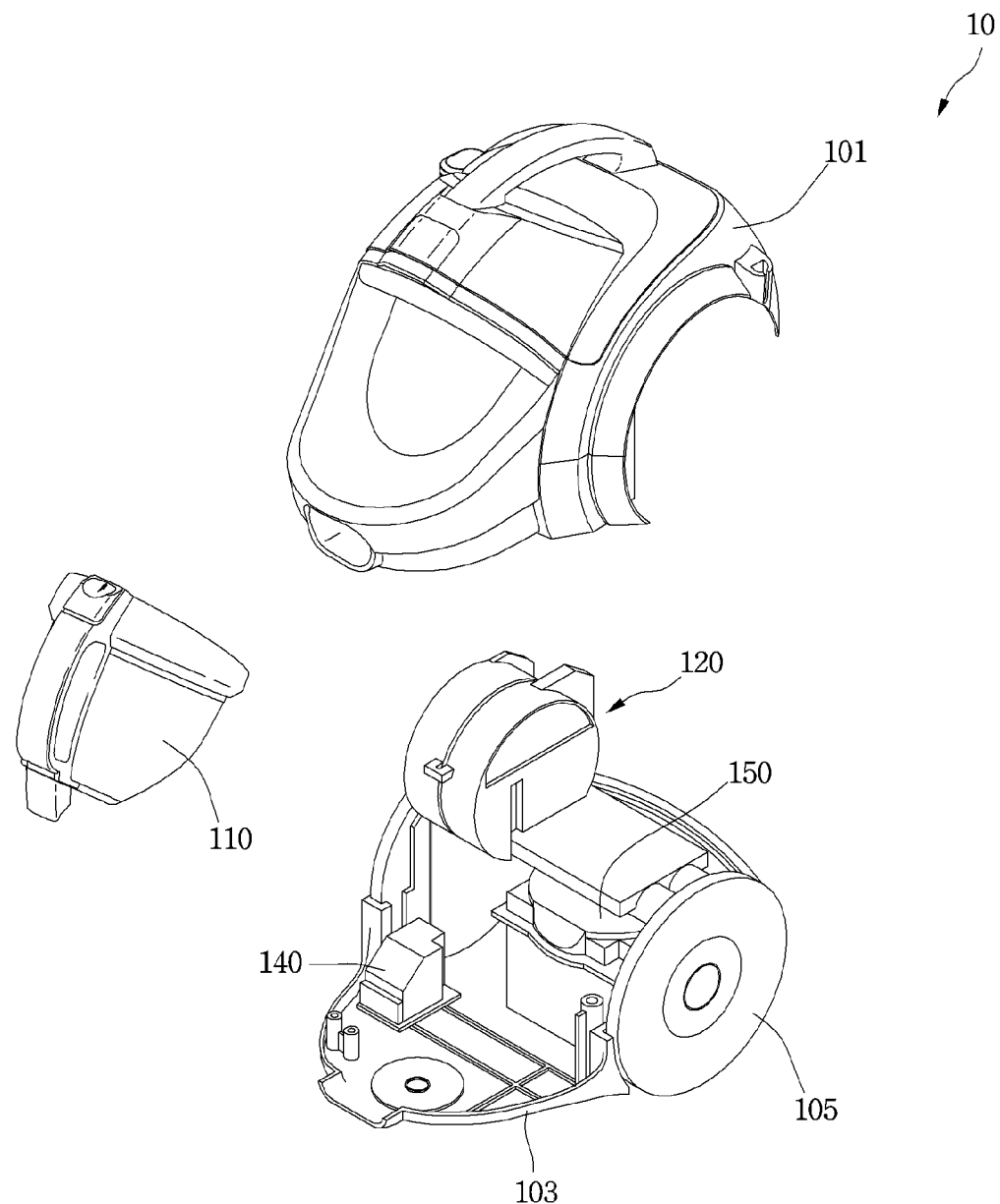
FIG. 2 is an exploded perspective view of a main body of the vacuum cleaner according to the first embodiment.
Figure 3:
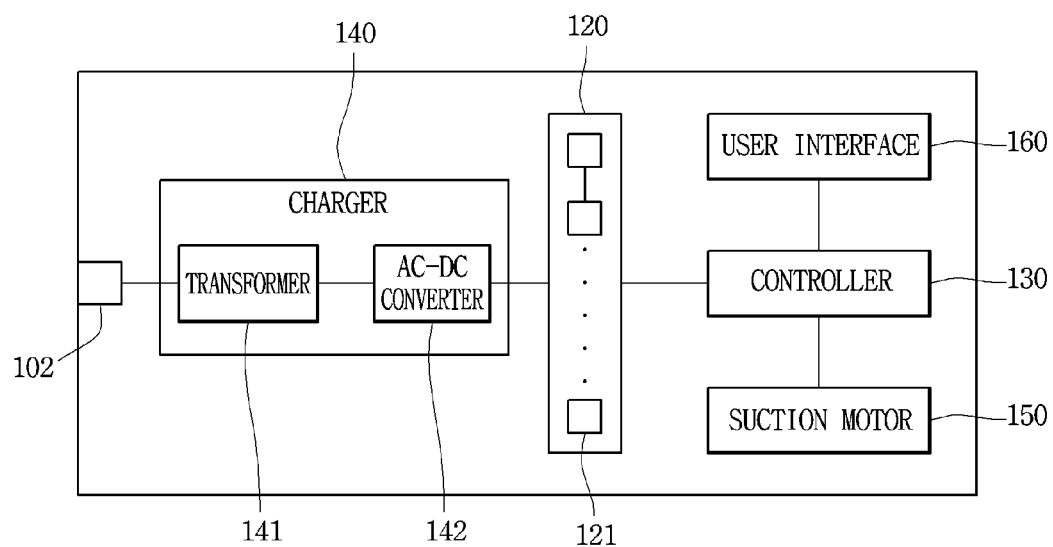
FIG. 3 is a block diagram of the vacuum cleaner according to the first embodiment.

FIG. 1 is a perspective view of a vacuum cleaner according to a first embodiment, FIG. 2 is an exploded perspective view of a main body of the vacuum cleaner according to the first embodiment, and FIG. 3 is a block diagram of the vacuum cleaner according to the first embodiment.

Referring to FIGS. 1 and 2, a vacuum cleaner 1 according to the first embodiment may include a cleaner body 10 including a suction motor 150 for generating a suction force and a suction device 20 for guiding air containing dusts to the cleaner body 10.

The suction device 20 may include a suction part 21 for suctioning dusts disposed on a surface to be cleaned, for example, a bottom surface and connection parts 22, 23, and 24 for connecting the suction part 21 to the cleaner body 10.

The connection part 22, 23, and 24 may include an extension tube 24 connected to the suction part 21, a handle 22 connected to the extension part 24, and a suction hose 23 connecting the handle 22 to the cleaner body 10.

Also, the vacuum cleaner 1 may further include a dust separation part (not shown) for separating dusts from air suctioned by the suction device 20 and a dust container 110 for storing the dusts separated by the dust separation part. The dust container 110 may be separably mounted on the cleaner body 10. The dust separation part may be provided as a separate part that is separated from the dust container 110 or be provided as one module together with the dust container 110.

The vacuum cleaner 1 may include a battery 120 supplying a power for operating the suction motor 150, a charger 140 for charging the battery 120, and a power cord 30 separably connected to the cleaner body 10 and supplying a commercial power into the cleaner body 10.

The power cord 30 may include a plug 31 connected to a socket and a first connector 32 connected to the cleaner body 10. Also, the cleaner body 10 may include a cleaner connector 102 connected to the first connector 32. For another example, the suction part 21 may include the cleaner connector.

The cleaner body 10 may include a first body 101 and a second body 103 coupled to a lower portion of the first body 101. A wheel 105 may be coupled to each of both sides of the second body 103.

The suction motor 150, the battery 120, the charger 140 may be disposed on the second body 103. Here, the battery 120 may be disposed on a side of the suction motor 150 to improve spatial efficiency.

The suction motor 150 and the battery 120 may be disposed between the plurality of wheels 105. Also, the battery 120 may be disposed between one of the plurality of wheels 105 and the suction motor 150. Also, the charger 140 may be disposed to be spaced apart from the battery 120. For another example, the battery 120 may be disposed on the suction part 21.

The dust container 110 may be separably coupled to the first body 101. Also, the cleaner connector 102 may be disposed on the first body 101.

The charger 140 may perform rectification and smoothing operations to convert a commercial AC voltage into a DC voltage. For example, the charger 140 may convert a commercial AC voltage of 42.4 V into a DC voltage that exceeds about 42.4 V.

The charger 140 may include a transformer 141 for converting the inputted AC voltage and an AC-DC converter 141 for converting an AC voltage outputted from the transformer 142 into a DC voltage. Here, the DC voltage outputted from the AC-DC converter 142 may exceed about 42.4 V.

For another example, the DC voltage outputted from the AC-DC converter 142 may be converted by the transformer 141. In this case, a DC voltage outputted from the transformer 141 may exceed about 42.4 V.

For another example, the charger 140 may not include the transformer, and the AC-DC converter 142 may include a circuit for preventing the DC voltage from being converted into the AC voltage. That is, the AC-DC converter 142 may be an isolated converter. In the current embodiment, since the wall-known converter is used as the AC-DC converter, detailed description thereof will be omitted.

The battery 120 may include a plurality of unit cells 121 that are connected to each other in series. The plurality of unit cells 121 may be maintained and managed to a constant voltage by a battery management system (BMS) (now shown). That is, the BMS may allow the battery 120 to output the predetermined voltage. The battery 120 may be a chargeable and dischargeable secondary battery. A maximum charging voltage that is capable of being charged in the battery 120 may have a value that exceeds a voltage of about 42.4 V. For example, the maximum charging voltage of the battery 120 may be above about 84.8 V.

In the current embodiment, the suction motor 150 may be, for example, a BLDC motor. Also, the suction motor 150 may have a maximum output of about 600 W or more.

When the voltage charged in the battery 120 is below about 42.4 V, current of at least 14.15 A or more has to be applied to operate the high-output suction motor 150. As a result, a circuit required for operating the suction motor 150 may be complicated.

However, according to the current embodiment, when the maximum voltage charged in the battery 120 is above about 84.8 V, current required for operating the suction motor 150 may be less than about 7.1 A. Thus, a circuit required for operating the suction motor 150 may be simplified.

According to the current embodiment, the voltage that exceeds about 42.4 V is charged into the battery 120, the suction motor 150 may realize a high output. Thus, the suction force of the vacuum cleaner may increase to improve cleaning performance.

Also, the power cord 30 may be connected to the vacuum cleaner 1 only during the charging of the battery 120. When the vacuum cleaner 1 performs cleaning, the power cord 30 may be separated from the vacuum cleaner 1. Thus, the degree of freedom in movement of the cleaner 1 may be improved.

That is, since the vacuum cleaner 1 does not include the cord reel and receives a power from the battery 120, the vacuum cleaner 1 is not limited to a movement direction thereof. While the vacuum cleaner 1 moves, it may be unnecessary to move over a cord wound around the cord reel or arrange the cord. Thus, the vacuum cleaner 1 may smoothly move.

Also, in the current embodiment, since the battery 120 is electrically connected to the cleaner connector 102, and the battery 120 has the maximum charging voltage of about 84.8 v or more, if the transformer 141 is not provided, the user may be dangerous when the user contacts the cleaner connector 102. However, according to the current embodiment, since the charger 140 includes the transformer 141, the transformer 141 may function as an insulation device to improve user safety.

The vacuum cleaner 1 may further include a user interface 160. The user interface 160 may receive an operation command of the vacuum cleaner 1 and display operation information or state information of the vacuum cleaner 1.

The user interface 160 may be disposed on at least one of the handle 22 and the cleaner body 10. The user interface 160 may be provided in a shape in which an input unit and a display unit are integrated with each other or include an input unit and a display unit which are separately provided.

A power on selection, a cleaning mode, and an intensity of the suction force of the vacuum cleaner 1 may be selected through the input unit. The display unit may display residual information of at least the battery 120.

The vacuum cleaner 1 may further include a controller 130. When a residual amount of battery 120 reaches a reference value, the controller 130 may control the display unit so that information for informing request of the charging of the battery 120 is displayed on the display unit.

For another example, the display unit may continuously or gradationally display the residual amount of battery 120. For example, the display unit may display the residual amount of battery 120 by using a figure or symbol or a graph shape. Alternatively, the display unit may include a plurality of light emitting parts to display the residual amount of battery 120 by changing the number of light emitting parts that are turned on. Alternatively, the display unit may display the residual amount of battery 120 by changing a color of light emitted from a light emitting part.

Figure 4:
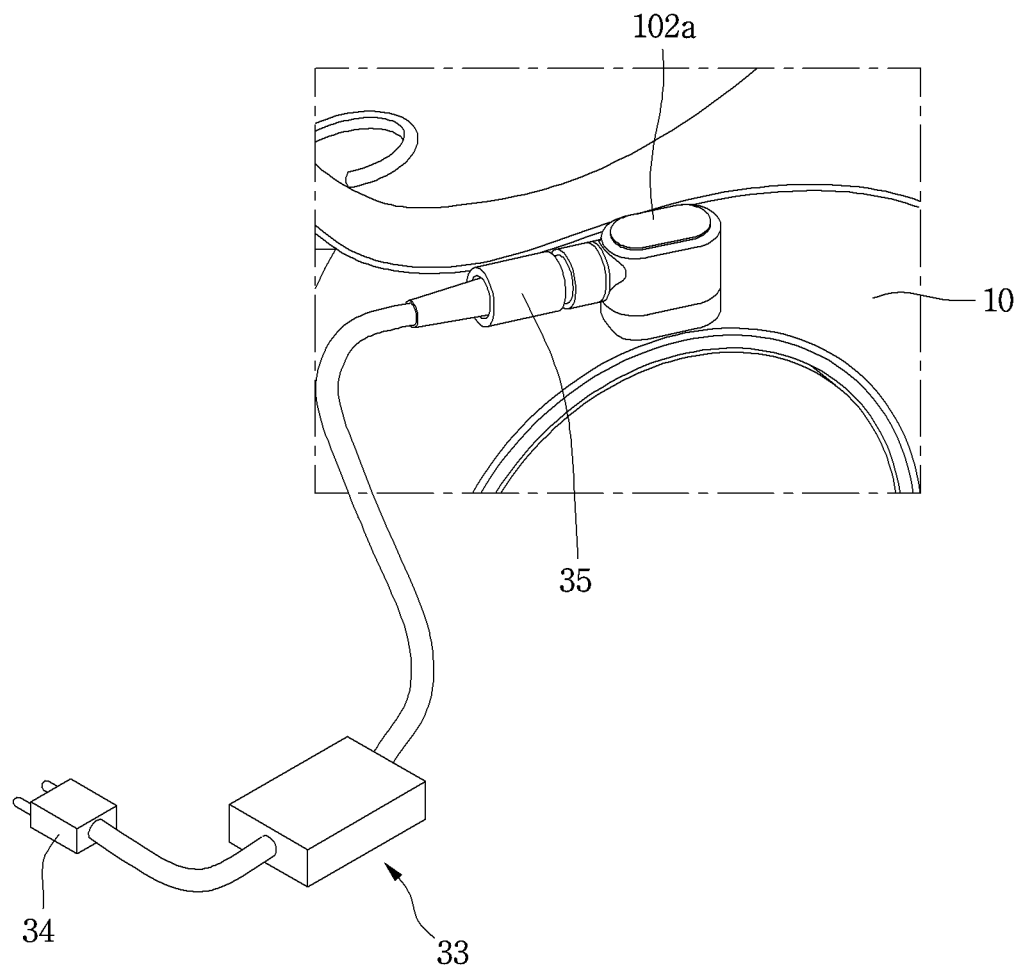
FIG. 4 is a schematic view of a vacuum cleaner according to a second embodiment.
Figure 5:
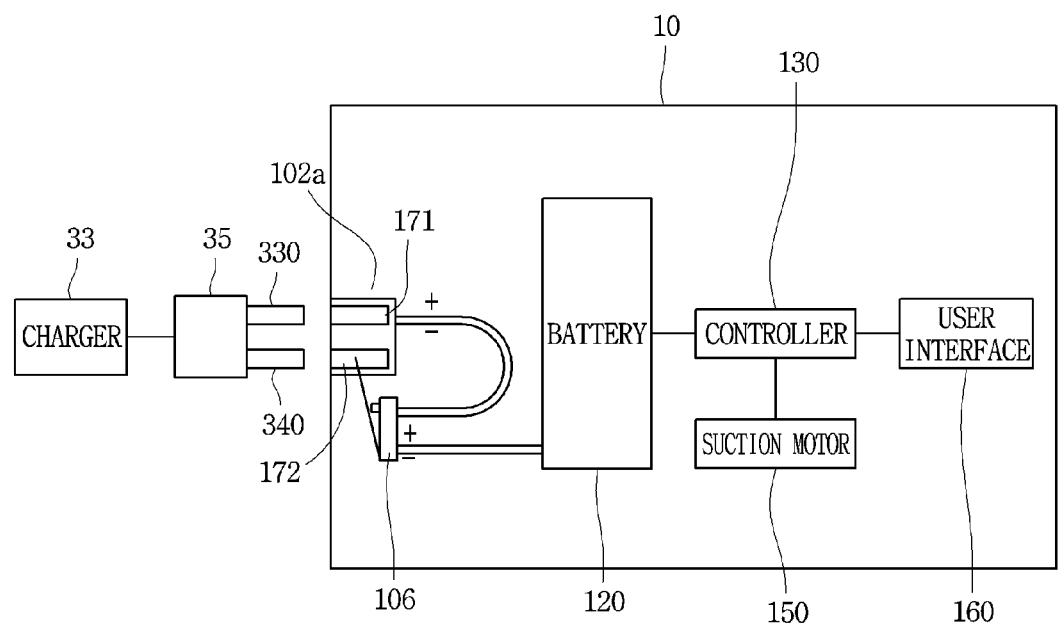
FIG. 5 is a block diagram of a vacuum cleaner according to the second embodiment.

FIG. 4 is a schematic view of a vacuum cleaner according to a second embodiment, and FIG. 5 is a block diagram of a vacuum cleaner according to the second embodiment.

Referring to FIGS. 4 and 5, a vacuum cleaner 1 according to the current embodiment may include a cleaner body 10 and a charger 33 separably connected to the cleaner body 10.

The vacuum cleaner 10 may further include a suction motor 150, a battery 120, a controller 130, and a user interface 160.

The charger 33 may include a plug 34 connected to a socket and a charger connector 35 connected to the cleaner body 10. Also, the cleaner body 10 may include a cleaner connector 102a connected to the charger connector 35. The cleaner connector 102a may protrude from a body defining the cleaner body 10. For another example, a suction part for suctioning air and dusts may include the cleaner connector 102a. In this case, the cleaner connector 102a may protrude from a body defining the suction part. For another example, the battery 120 assembly may be disposed on the suction part.

The charger 33 may perform rectification and smoothing operations to convert a commercial AC voltage into a DC voltage. Also, the charger 33 may supply the converted DC voltage to the cleaner body 10. For example, the charger 33 may convert the commercial AC voltage into a DC voltage that exceeds about 42.4 V to supply the converted DC voltage to the cleaner body 10.

Also, the battery 120 may receive the DC voltage outputted from the charger 33 and thus be charged. Here, a maximum charging voltage of the battery 120 may exceed about 42.4 V. For example, the maximum charging voltage of the battery 120 may be above about 84.8 V.

In the current embodiment, since the voltage that exceeds about 42.4 V is outputted from the charger 33, an insulation structure may be provided to the charger connector 35 of the charger 33.

Also, the battery 120 may be electrically connected to the cleaner connector 102a. In the current embodiment, since the maximum charging voltage of the battery 120 exceeds about 42.4 V, an insulation structure may be provided to the cleaner body 10.

The charger connector 35 may include a charger terminal part 330 and a switch manipulation part 340. The charger terminal part 330 is disposed to be spaced apart from the switch manipulation part 340.

The cleaner connector 102a may include a terminal insertion part in which the charger terminal part 330 is inserted and a manipulation part insertion part 172 in which the switch manipulation part 340 is inserted. Also, the cleaner body 10 may include a disconnection member 106 for connecting or disconnecting the charger terminal part 330 to or from the battery 120. For example, the disconnection part 106 may be a switch. Here, when the cleaner connector 102a is disposed on the suction part, the disconnection part may also be disposed on the suction part.

A portion of the disconnection member 106 may be disposed on the manipulation part insertion part 172. Thus, the disconnection member 106 may operate by the switch manipulation part 340 that is inserted into the manipulation part insertion part 172.

Also, the disconnection member 106 may be disposed outside the manipulation part insertion part 172, and a transmission part may be disposed on the manipulation part insertion part 172. In this case, when the switch manipulation part 340 is inserted into the manipulation part insertion part 172, the transmission part may move to operate the disconnection member 106.

When the disconnection member 106 is turned on, the cleaner connector 102a and the battery 120 are electrically connected to each other. When the disconnection member 106 is turned off, the cleaner connector 102a and the battery 120 are electrically disconnected from each other.

In the current embodiment, when the charger connector is connected to the cleaner connector 102a, the switch manipulation part 340 may turn the disconnection member 106 on. In this state, a DC voltage outputted from the charger 33 may be supplied to the battery 120.

On the other hand, when the charger connector 35 is separated from the cleaner connector 102a, the disconnection member 106 may be turned off. When the disconnection member 106 is turned off, the cleaner connector 102a and the battery 120 may be electrically disconnected from each other.

Thus, in the state where the charger connector 35 is separated from the cleaner connector 102a, the cleaner connector 102a may be insulated. That is, since the cleaner connector 102a is insulated even though a charging voltage of the battery 120 is high, safety of the vacuum cleaner 1 may be secured.

In the current embodiment, if the disconnection member 106 operates by the charger connector 35, and the disconnection member 106 selectively connects the cleaner connector 102a to the battery 120, the current embodiment is not limited to a position and structure of the disconnection member 106.

According to the current embodiment, the suction motor 150 may realize a high output. Thus, the suction force of the vacuum cleaner 1 may increase to improve the cleaning performance.

Figure 6:
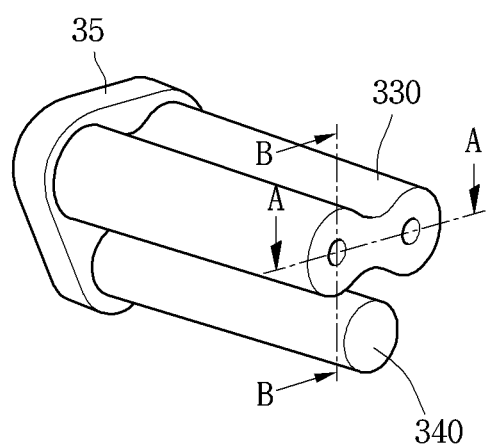
FIG. 6 is a perspective view of a charger connector according to the second embodiment.
Figure 7:
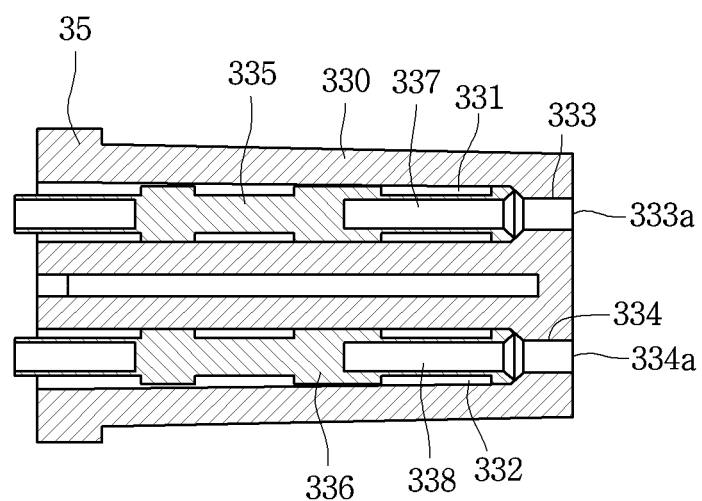
FIG. 7 is a cross-sectional view taken along line A-A' of FIG. 6.
Figure 8:
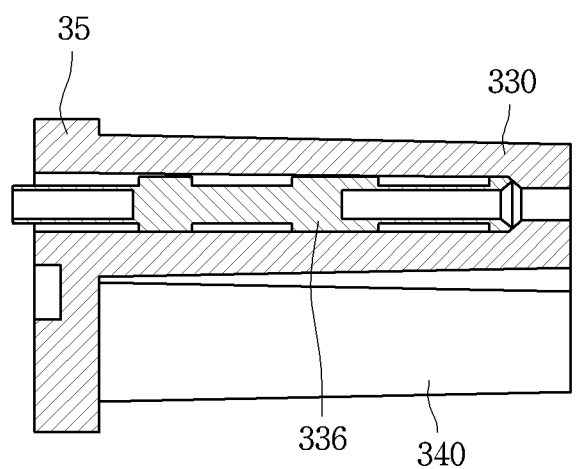
FIG. 8 is a sectional view taken along line B-B' of FIG. 6.

FIG. 6 is a perspective view of the charger connector according to the second embodiment, FIG. 7 is a cross-sectional view taken along line A-A' of FIG. 6, and FIG. 8 is a sectional view taken along line B-B' of FIG. 6.

Referring to FIGS. 6 to 8, the charger connector 35 may include a charger terminal part 330 and a switch manipulation part 340.

For example, the charger terminal part 330 may include a first charger terminal 335 that is a positive (+) terminal and a second charger terminal 336 that is a negative (-) terminal. The charger terminal part 330 may have a housing shape for independently accommodating the first charger terminal 335 and the second charger terminal 336.

The first and second charger terminals 335 and 336 may be disposed within the charger terminal part 330 in a state where the first and second charger terminals 335 and 336 are spatially separated from each other. That is, the charger terminal part 330 may include a first terminal accommodation part 331 for accommodating the first charger terminal 335 and a second terminal accommodation part 332 for accommodating the second charger terminal 336.

The charger terminal part 330 may have terminal through-holes 333 and 334 through which main body terminals 173 and 174 that will be described later pass. The terminal through-holes 333 and 334 may include a first terminal through-hole 333 and a second terminal through-hole 334.

Here, ends of the charger terminals 335 and 336 respectively accommodated into the terminal accommodation parts 331 and 332 are spaced a predetermined distance from inlets 333a and 334a of the terminal through-holes 333 and 334, respectively.

Thus, according to the current embodiment, since each of the charger terminals 335 and 336 is accommodated into the charger terminal part 330, and the charger terminals 335 and 336 are respectively spaced a predetermined distance from the inlets 333a and 334a of the terminal through-holes 333 and 334, the charger connector 35 may be insulated.

Thus, even though the voltage that exceeds about 42.4 V is outputted from the charger 33, the safety of the charger 33 may be secured.

The charger terminals 335 and 336 includes main body terminal insertion grooves 337 and 338 into which the main body terminals 173 and 174 passing through the terminal through-holes 333 and 334 are inserted, respectively. Thus, when the main body terminals 173 and 174 are inserted into and contact the main body terminal insertion grooves 337 and 338 of the charger terminal 335 and 336, the charger terminals 335 and 336 and the main body terminals 173 and 174 may be electrically connected to each other.

Figure 9:
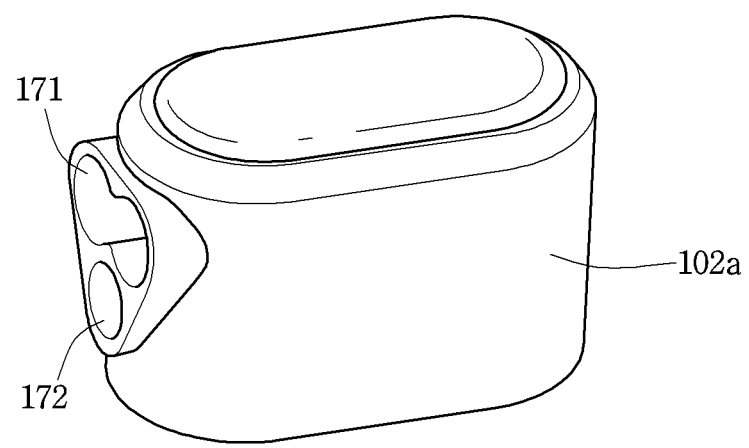
FIG. 9 is a perspective view of the charger connector according to the second embodiment.
Figure 10:
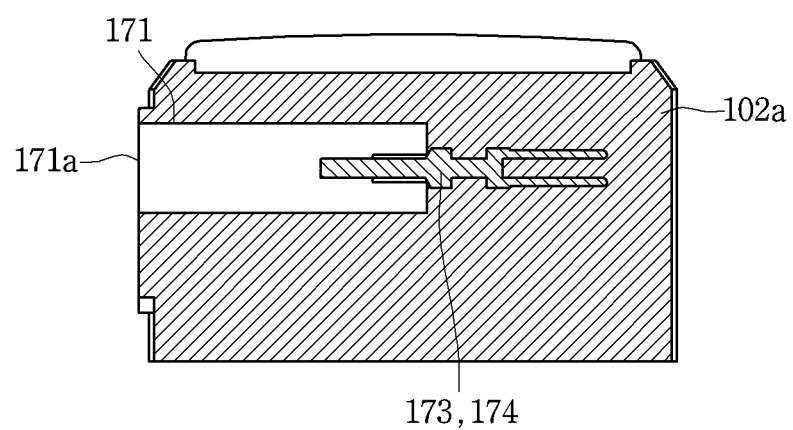
FIG. 10 is a cross-sectional view of the charger connector according to the second embodiment.

FIG. 9 is a perspective view of the charger connector according to the second embodiment, and FIG. 10 is a cross-sectional view of the charger connector according to the second embodiment.

Referring to FIGS. 9 and 10, the cleaner connector 102a according to the current embodiment may include the terminal insertion part 171 and the manipulation part insertion part 172 into which the switch manipulation part 340 is inserted, as described above. That is, each of the terminal insertion part 171 and the manipulation part insertion part 172 may be a groove. The terminal insertion part 171 and the manipulation part insertion part 172 may be spaced apart from each other. For example, the terminal insertion part 171 and the manipulation part insertion part 172 may be spatially partitioned from each other.

A plurality of main body terminals 173 and 174 may be disposed in the terminal insertion part 171. The plurality of main body terminals 173 and 174 may include a first main body terminal 173 and a second main body terminal 174. Also, the first main body terminal 173 and the second main body terminal 174 may be disposed to be spaced apart from each other. Each of the main body terminals 173 and 174 may be disposed to be spaced apart from an inlet 171a of the terminal insertion part 171.

Thus, when the charger terminal part 330 is inserted into the terminal insertion part 171, the main body terminals 173 and 174 may pass through the terminal through-holes 333 and 334 and then be inserted into the main body terminal insertion grooves 337 and 338 of the charger terminals 335 and 336, respectively.

When the main body terminals 173 and 174 are inserted into the main body terminal insertion grooves 337 and 338, resistance of each of the charger terminals 335 and 336 may vary. The charger 33 may determine a variation in resistance of each of the charger terminals 335 and 336 to start charging after a predetermined time elapses after the resistance is changed.

That is, the charger 33 may supply a DC voltage to the cleaner body 10 after a predetermined time elapses after the charger connector 35 is coupled to the cleaner connector 102a.

In the current embodiment, the structure of the charger connector of the charger may be equally applied to the first connector according to the first embodiment, and the structure of the cleaner connector may be equally applied to the cleaner connector according to the first embodiment. However, in the application of the constitutions according to the current embodiment to the first embodiment, the switch manipulation part of the charger connector and the manipulation part insertion part of the cleaner connector may be omitted. Thus, the first connector according to the first embodiment may also be insulated.

Figure 11:
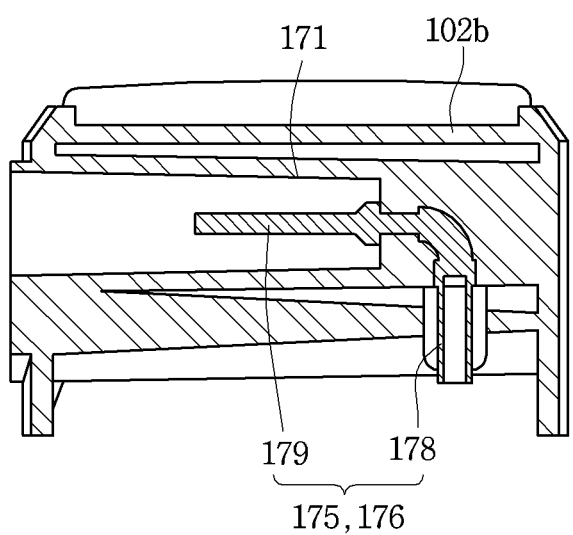
FIG. 11 is a view of a cleaner connector according to a third embodiment.
Figure 12:
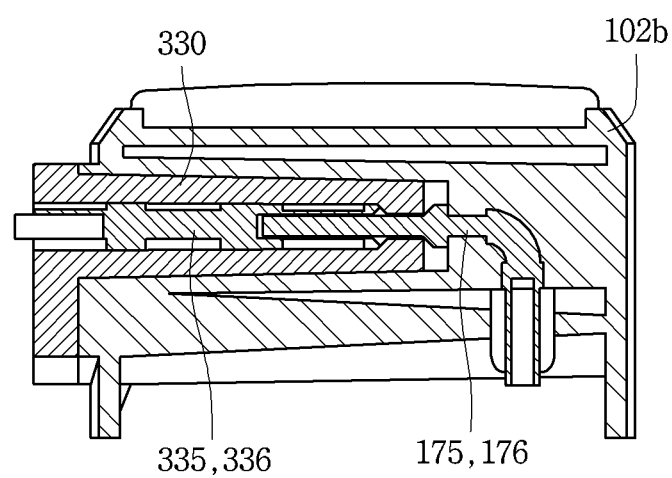
FIG. 12 is a view illustrating a state in which a charger connector is connected to the cleaner connector of FIG. 11.

FIG. 11 is a view of a cleaner connector according to a third embodiment, and FIG. 12 is a view illustrating a state in which a charger connector is connected to the cleaner connector of FIG. 11.

The current embodiment is the same as the second embodiment except that a shape of a main body terminal disposed on a cleaner connector. Thus, only characterized parts in the current embodiment will be described below.

Referring to FIGS. 11 and 12, a cleaner connector 102b according to the current embodiment may include a plurality of main body terminals 175 and 176. Each of the main body terminals 175 and 176 may include a first portion 179 protruding from a terminal insertion part 171 and inserted into a main body terminal insertion groove (see reference numerals 337 and 338 of FIG. 7) of each of the charger terminals 335 and 336 and a second portion 178 bent from the first portion 179. The second portion 178 may be fixed to the cleaner connector 102b, and an electric wire may be connected to the second portion 178. For example, each of the main body terminals 175 and 176 may have "⌐" shape.

According to the current embodiment, since each of the main body terminals 175 and 176 has the bent shape, the cleaner connector 102b may be reduced in size.

Figure 13:
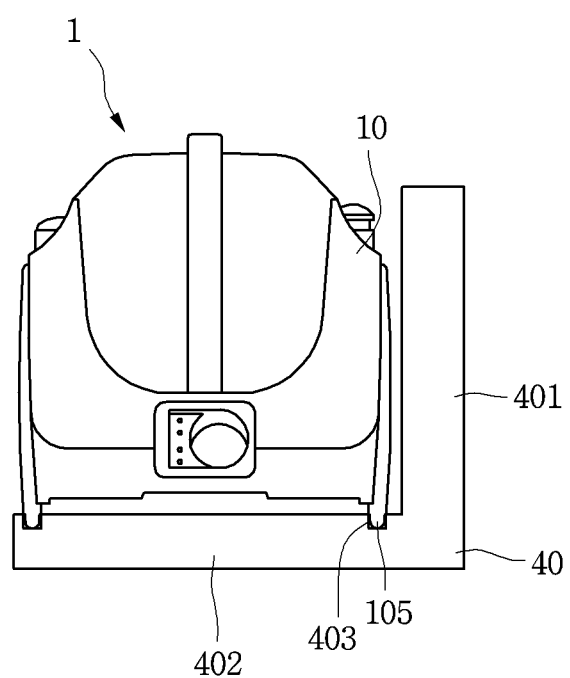
FIG. 13 is a view illustrating a charging system of a vacuum cleaner according to a fourth embodiment.
Figure 14:
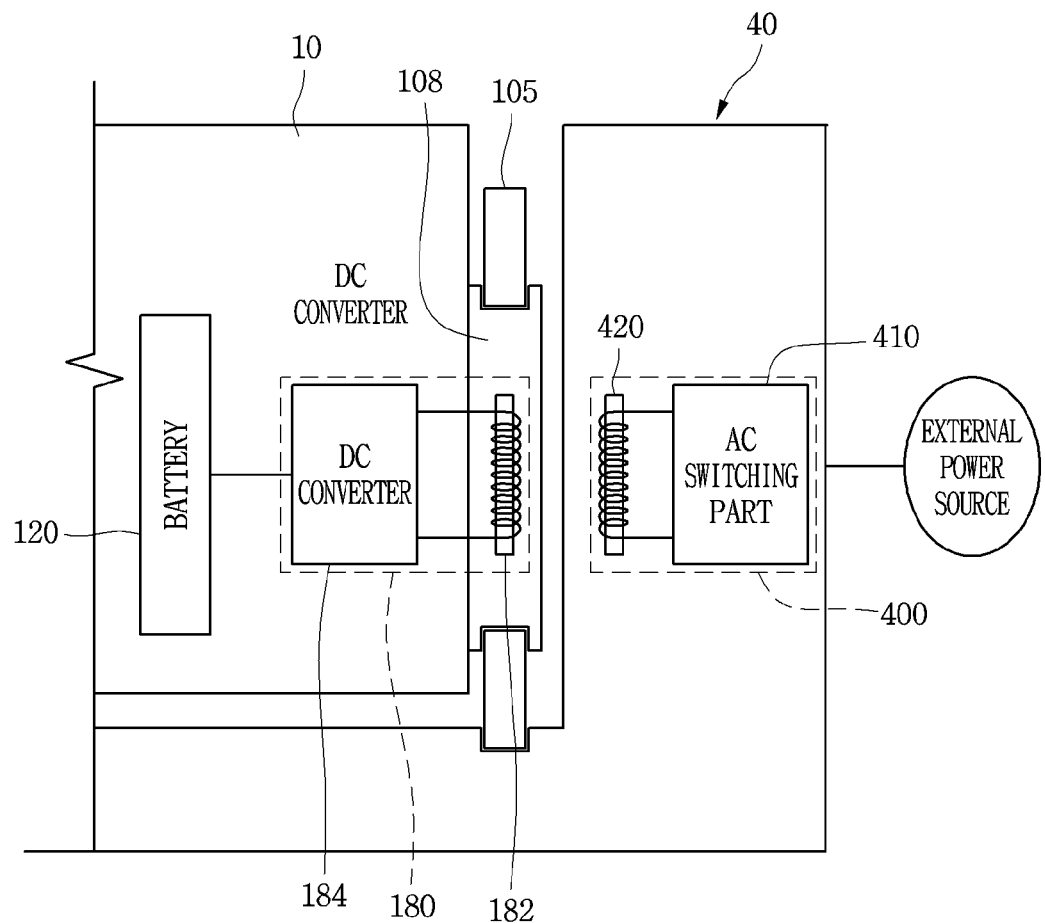
FIG. 14 is a view of the charging system of FIG. 13.

FIG. 13 is a view illustrating a charging system of a vacuum cleaner according to a fourth embodiment, and FIG. 14 is a view of the charging system of FIG. 13.

Referring to FIGS. 13 and 14, a charging system of a vacuum cleaner according to an embodiment may include a vacuum cleaner 1 and a charging device 30 for charging a battery 120 of the vacuum cleaner 1.

The vacuum cleaner 1 may include a cleaner body 10 including the battery 120. A wheel connection part 108 providing a rotation center of a wheel 105 may be disposed on a side surface of the cleaner body 10. For example, the wheel connection part 108 may be separably connected or integrally connected to the side surface of the cleaner body 10. Also, the wheel 105 may be rotatably connected to the wheel connection part 108.

The wheel 105 may be coupled to the wheel connection part 108 to surround the wheel connection part 108. Alternatively, a rotation shaft may be disposed on the wheel connection part 108, and the wheel 105 may be connected to the rotation shaft.

The charging device may include a first body 401 on which a charging signal generation part (or a charging signal transmission part) 400 for transmitting a charging signal and a second body 402 extending from the first body 401 to support the cleaner body 10.

The cleaner body 10 may include a charging current generation part 180 for charging a battery 120.

The charging signal generation part 400 and the charging current generation part 180 may transmit and receive a signal in a state where the charging signal generation part 400 and the charging current generation part 180 are physically spaced apart from each other to charge the battery 120.

The charging signal generation part 400 may include a first coil part 420 to which a predetermined current and voltage are applied to generate magnetic fields and an AC switching part 410 for applying the predetermined current and voltage to the first coil part 420.

The charging current generation part 180 may include a second coil part 182 that is affected by the magnetic fields generated by the first coil part 420 to generate current and a DC converter 184 for converting the AC current generated by the second coil part 182 into DC current.

In detail, a plurality of coils are wound around the first coil part 420. When predetermined current flows through the first coil part 420, magnetic fields may be generated in a direction perpendicular to the current flow direction by the AMPERE law.

The magnetic fields may be formed within a predetermined region. In a state where the second coil part 182 is disposed within the predetermined region, current may flow toward the second coil part 182 by the magnetic fields. Here, a direction of the current flowing toward the second coil part 182 may be opposite to the direction in which the current flows through the first coil part 420.

Thus, when the current flows toward the second coil 182, the current may be supplied to the battery 120 via the DC converter 184 to charge the battery 120.

As described above, since the current flows into the vacuum cleaner 1 by using the magnetic fields generated in the charging device 40 as a medium, the battery 120 may be charged without the physically contact between the vacuum cleaner 1 and the charging device 40.

In the current embodiment, to allow the current to effectively flow through the second coil part within the predetermined region in which the magnetic fields are generated, at least a portion of the second coil part 182 may be disposed on the wheel connection part 108.

A wheel seat part 403 on which the wheel 105 is seated may be disposed on the second body 402. When the wheel 105 is seated on the wheel seat part 403, since the second coil part 182 is disposed within the predetermined region in which the magnetic fields are formed, the current may flow through the second coil 182. Of cause, in the current embodiment, the second body 402 may be omitted in the charging device 40.

According to the current embodiment, since the terminal is not exposed to the vacuum cleaner 1 and the charging device 40, the battery 120 may have the maximum changing voltage that exceeds about 42.4 V. Thus, the high-output suction motor may be used. Also, even though the charging voltage of the battery 120 exceeds about 42.4 V, the safety of the product may be secured.

Although a canister-type cleaner is described as an example of the vacuum cleaner, the foregoing embodiments may be applied to an upright-type cleaner. That is, the upright-type cleaner may include a suction part and a cleaner body connected to the suction part. Here, a battery for supplying a power to a suction motor may be disposed on the suction part or the cleaner body. Also, the above-described charger may be connected to the suction part or the cleaner body.

Here, the cleaner body may be divided into two or more main bodies. For example, the suction motor may be disposed on a first main body of the two or more main bodies, and the first main body on which the suction motor is disposed may be connected to the suction part. Also, a second body may be connected to the first body, and a dust container for storing dusts may be disposed in the second body.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A vacuum cleaner comprising:
   a cleaner body comprising a suction motor for generating suction;
   a suction part communicating with the cleaner body to receive air and dust particles;
   a battery disposed in the cleaner body or the suction part to supply power to the suction motor; and
   a cleaner connector disposed on the cleaner body or the suction part;
   wherein the cleaner connector comprises a terminal insertion part comprising a plurality of main body terminals connected to corresponding a plurality of charger terminals of a charger terminal part of a vacuum cleaner charger when the charger terminal part is inserted in the cleaner connector,
   wherein the cleaner connector protrudes from the cleaner body or the suction part,
   wherein each of the plurality of main body terminals comprises a first portion inserted into the charger terminal and a second portion having a bent shape extending from the first portion and connected to the cleaner body or the suction part.

2. The vacuum cleaner according to claim 1, wherein the charger terminal part comprises an accommodation part accommodating the plurality of charger terminals and a plurality of terminal through-holes through which the plurality of main body terminals to pass therethrough and connect to the charger terminals, respectively.

3. The vacuum cleaner according to claim 2, wherein each of the plurality of charger terminals has a main body terminal insertion groove into which each of the main body terminals passing through the terminal through-holes is inserted.

4. The vacuum cleaner according to claim 1, wherein the plurality of main body terminals are spaced apart from an inlet of the terminal insertion part.

* * * * *